US009661390B2

(12) United States Patent
Li et al.

(10) Patent No.: US 9,661,390 B2
(45) Date of Patent: May 23, 2017

(54) METHOD, SERVER, AND USER TERMINAL FOR SHARING VIDEO INFORMATION

(71) Applicant: Xiaomi Inc., Beijing (CN)

(72) Inventors: Chuangqi Li, Beijing (CN); Yingjun Gao, Beijing (CN); Nan Wu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/629,693

(22) Filed: Feb. 24, 2015

(65) Prior Publication Data

US 2016/0029093 A1 Jan. 28, 2016

Related U.S. Application Data

(63) Continuation of application No. PCT/CN2014/091647, filed on Nov. 19, 2014.

(30) Foreign Application Priority Data

Jul. 24, 2014 (CN) .......................... 2014 1 0356152

(51) Int. Cl.
*H04N 21/4788* (2011.01)
*H04N 21/84* (2011.01)
(Continued)

(52) U.S. Cl.
CPC ......... *H04N 21/4788* (2013.01); *G06F 3/033* (2013.01); *G06F 3/048* (2013.01);
(Continued)

(58) Field of Classification Search
USPC ................ 725/110, 112; 715/758, 752, 823; 705/319; 709/205
See application file for complete search history.

(56) References Cited

U.S. PATENT DOCUMENTS 8,555,177 B1\* 10/2013 Junee .................... H04L 65/403
715/719
2005/0246752 A1\* 11/2005 Liwerant ................ G06Q 30/02
725/109
(Continued)

FOREIGN PATENT DOCUMENTS

CN 101640857 A 2/2010
CN 102611925 A 7/2012
(Continued)

OTHER PUBLICATIONS

International Search Report of PCT/CN2014/091647, from the State Intellectual Property Office of China, mailed Apr. 20, 2015.
(Continued)

*Primary Examiner* — Hoang-Vu A Nguyen-Ba
(74) *Attorney, Agent, or Firm* — Finnegan, Henderson, Farabow, Garrett & Dunner LLP

(57) ABSTRACT

A method for a server to share video information, includes: receiving descriptive information regarding a video from a first user terminal; and sending the descriptive information to a second user terminal, for the second user terminal to play the video according to the descriptive information, wherein a first user of the first user terminal has a preset relationship with a second user of the second user terminal.

18 Claims, 13 Drawing Sheets

(51) Int. Cl.

| | | |
|---|---|---|
| H04N 21/462 | (2011.01) | |
| H04N 21/488 | (2011.01) | |
| H04N 21/61 | (2011.01) | |
| H04N 5/93 | (2006.01) | |
| H04N 21/43 | (2011.01) | |
| H04N 21/658 | (2011.01) | |
| H04N 21/845 | (2011.01) | |
| G06F 3/048 | (2013.01) | |
| G06F 3/033 | (2013.01) | |
| H04N 21/643 | (2011.01) | |

(52) U.S. Cl.
CPC ....... H04N 5/9305 (2013.01); H04N 21/4307 (2013.01); H04N 21/4622 (2013.01); H04N 21/4888 (2013.01); H04N 21/6125 (2013.01); H04N 21/64322 (2013.01); H04N 21/6581 (2013.01); H04N 21/84 (2013.01); H04N 21/8455 (2013.01)

(56) References Cited

U.S. PATENT DOCUMENTS

| | | | |
|---|---|---|---|
| 2009/0007216 A1* | 1/2009 | Ku | H04N 7/17327 725/142 |
| 2010/0318520 A1 | 12/2010 | Loeb et al. | |
| 2011/0158605 A1* | 6/2011 | Bliss | G06F 17/30884 386/241 |
| 2011/0214148 A1* | 9/2011 | Gossweiler, III | H04N 21/235 725/46 |
| 2012/0060104 A1 | 3/2012 | Feng et al. | |
| 2012/0181197 A1 | 7/2012 | Dieter et al. | |
| 2012/0284343 A1 | 11/2012 | Lee et al. | |
| 2013/0024532 A1 | 1/2013 | Lee et al. | |
| 2014/0181197 A1 | 6/2014 | Baggott | |

FOREIGN PATENT DOCUMENTS

| | | |
|---|---|---|
| CN | 102932681 A | 2/2013 |
| CN | 103596017 A | 2/2014 |
| CN | 103634621 A | 3/2014 |
| CN | 103686396 A | 3/2014 |
| JP | 2014011597 A | 1/2014 |
| JP | 2014027524 A | 2/2014 |
| KR | 1020140047232 | 4/2014 |
| RU | 2449353 C2 | 4/2012 |
| WO | WO 2011/079477 A1 | 7/2011 |

OTHER PUBLICATIONS

Extended Search Report for European Application No. EP 15176676.3 from the European Patent Office, dated Sep. 22, 2015.
English version of international Search Report of PCT/CN2014/091647, from the State Intellectual Property Office of China, mailed Apr. 20, 2015.
Notification on Patentability Check Results dated Apr. 25, 2016, in counterpart Russian Application No. 2015103368/08(005323) and English translation thereof.

* cited by examiner

METHOD, SERVER, AND USER TERMINAL FOR SHARING VIDEO INFORMATION

CROSS REFERENCE TO RELATED APPLICATIONS

This application is a Continuation of International Application No. PCT/CN2014/091647, filed Nov. 19, 2014, which is based upon and claims priority to Chinese Patent Application No. 201410356152.5, filed Jul. 24, 2014, the entire contents of all of which are incorporated herein by reference.

TECHNICAL FIELD

The present disclosure generally relates to the field of network video technology and, more particularly, to a method and a device for sharing video information.

BACKGROUND

With the development of Internet technologies, more and more users watch videos over the Internet. For example, a user can use an Internet video set-top box to connect a television to a server of a video service provider over the Internet. The user can select a video to watch by operating the Internet video set-top box.

SUMMARY

According to a first aspect of the present disclosure, there is provided a method for a server to share video information, comprising: receiving descriptive information regarding a video from a first user terminal; and sending the descriptive information to a second user terminal, for the second user terminal to play the video according to the descriptive information, wherein a first user of the first user terminal has a preset relationship with a second user of the second user terminal.

According to a second aspect of the present disclosure, there is provided a method for sharing video information on a second user terminal, the second user terminal being configured to communicate with a first user terminal through a server, the method comprising: receiving descriptive information regarding a video from the server, the descriptive information being provided by a first user of the first user terminal having a preset relationship with a second user of the second user terminal; displaying the descriptive information; and playing the video according to the descriptive information upon receiving an operation for playing of the video.

According to a third aspect of the present disclosure, there is provided a server for sharing video information, comprising: a processor; a memory for storing instructions executable by the processor; wherein the processor is configured to: receive descriptive information regarding a video from a first user terminal; and send the descriptive information to a second user terminal, for the second user terminal to play the video according to the descriptive information, wherein a first user of the first user terminal has a preset relationship with a second user of the second user terminal.

According to a fourth aspect of the present disclosure, there is provided a second user terminal for sharing video information, the second user terminal being configured to communicate with a first user terminal through a server, the second user terminal comprising: a processor; and a memory for storing instructions executable by the processor; wherein the processor is configured to: receive descriptive information regarding a video from the server, the descriptive information being provided by a first user of the first user terminal having a preset relationship with a second user of the second user terminal; display the descriptive information; and play the video according to the descriptive information upon receiving an operation for playing of the video.

It shall be appreciated that the above general description and the detailed description hereinafter are only illustrative but not for limiting the present disclosure.

BRIEF DESCRIPTION OF THE DRAWINGS

The accompanying drawings, which are incorporated in and constitute a part of the specification, illustrate embodiments consistent with the invention, and together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
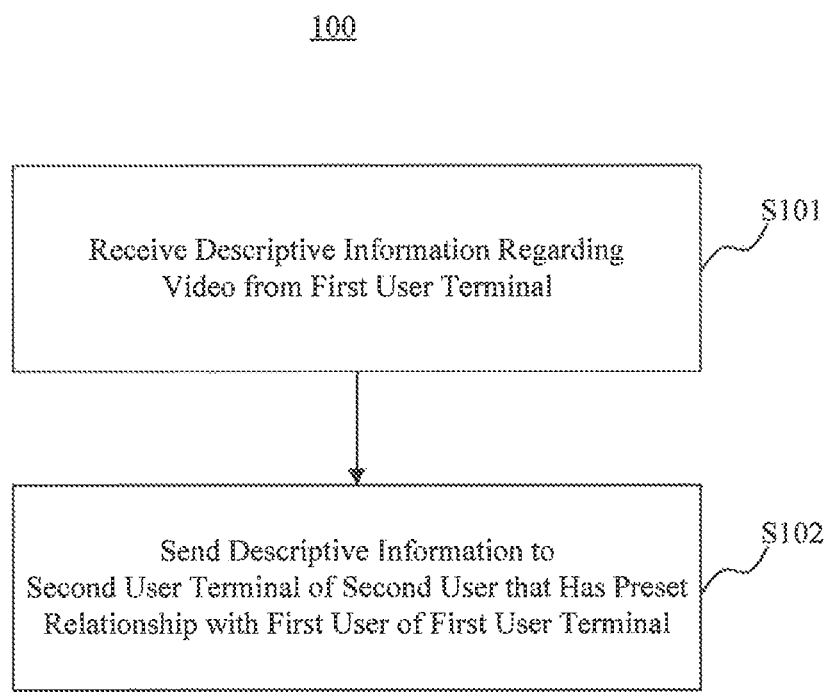
FIG. 1 is a flowchart of a method for sharing video information, according to an exemplary embodiment.

FIG. 1 is a flowchart of a method 100 for sharing video information, according to an exemplary embodiment. For example, the method 100 may be used in a server. Referring to FIG. 1, the method 100 includes the following steps.

In step S101, the server receives descriptive information regarding a video from a first user terminal.

For example, the first user terminal may be a personal computer (PC), a smart phone, a tablet computer, or the like.

The first user terminal may also be a television coupled with an Internet video set-top box, or the like. The present disclosure sets no limitation to the specific form of the first user terminal.

In exemplary embodiments, when the first user terminal plays the video, the first user terminal may, at any time, receive from a first user a piece of descriptive information with respect to the video, and send the descriptive information to the server.

In step S102, the server sends the descriptive information to a second user terminal of a second user that has a preset relationship with the first user, such that the second user terminal can play the video according to the received descriptive information.

In exemplary embodiments, the relationship between the first user and the second user may be an association relationship set by the first user by, for example, adding the second user as a friend in an application, or may be an association relationship determined by the server by, for example, determining that the first user terminal and the second user terminal are within the same IP address range. In one exemplary embodiment, the server obtains a friend list of the first user from the first user terminal, and identifies the second user having a preset relationship with the first user based on the friend list of the first user, or the like. The present disclosure sets no limitation thereto. In addition, it should be understood that there may be one or more second user terminals.

In exemplary embodiments, the above-described relationship may be established after the server receives the descriptive information, or may be established in the process of communication with the first user terminal and directly used after the descriptive information is received.

In exemplary embodiments, the descriptive information may include at least one of: a play progress of the video currently played on the first user terminal, a comment made by the first user regarding the video, an identifier of the video, a play IP address of the video, and a play progress of the video when the first user comments on the video.

Figure 2:
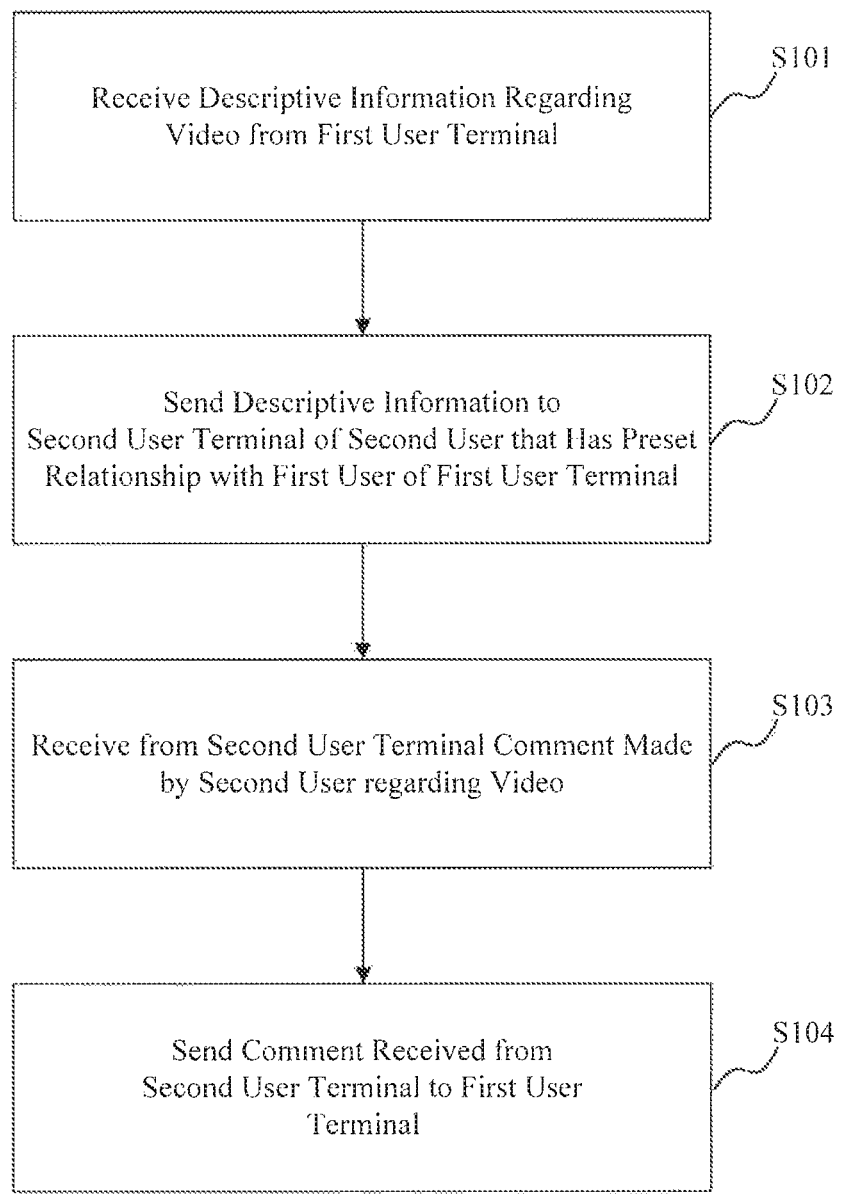
FIG. 2 is a flowchart of a method for sharing video information, according to an exemplary embodiment.

FIG. 2 is a flowchart of a method 200 for sharing video information, according to an exemplary embodiment. Referring to FIG. 2, in addition to steps S101 and S102 (FIG. 1), the method 200 further includes the following steps.

In step S103, the server receives from the second user terminal a comment made by the second user regarding the video.

In step S104, the server sends the comment received from the second user terminal to the first user terminal, such that the first user terminal receives the comment and displays the comment.

For example, upon receiving the descriptive information regarding the video, the second user terminal may receive a comment regarding the video by the second user, or receive a response to the comment made by the first user regarding the video.

In one exemplary embodiment, the first user terminal is a television, and the second user terminal is a smart phone. For example, the television may include a set-top box, and plays an Internet video. The television receives a piece of descriptive information with respect to the Internet video via a remote control or a keyboard, for example, a comment regarding the video by the first user. The television then sends the descriptive information to the server. The server forwards the descriptive information to the smart phone. Upon receiving the descriptive information, the smart phone may send a response to the comment made by the first user, and the server forwards the response to the television.

In addition, the second user terminal may also request the server to play the video on the second user terminal. In exemplary embodiments, when the second user terminal requests the server to play the video, one or more options may be provided to the second user, for example, playing the video from the start of the video, or playing the video from a play progress of the video when the first user terminal receives the descriptive information from the first user, or playing the video from a play progress of the video being currently played on the first user terminal, or the like. In some other embodiments, the server may initiatively determine to play the video on the second user terminal from a play progress according to one or more predetermined rules, which is not limited in the present disclosure.

In the illustrated embodiment, the server may send descriptive information of a video received on the first user terminal to the second user terminal. In this way, video information is propagated from the first user terminal to the second user terminal, such that timely sharing of the video information may be implemented between terminals. This can achieve a higher propagation speed of the video information compared to conventional video sharing methods, and improve the usage rate of video resources.

Figure 3:
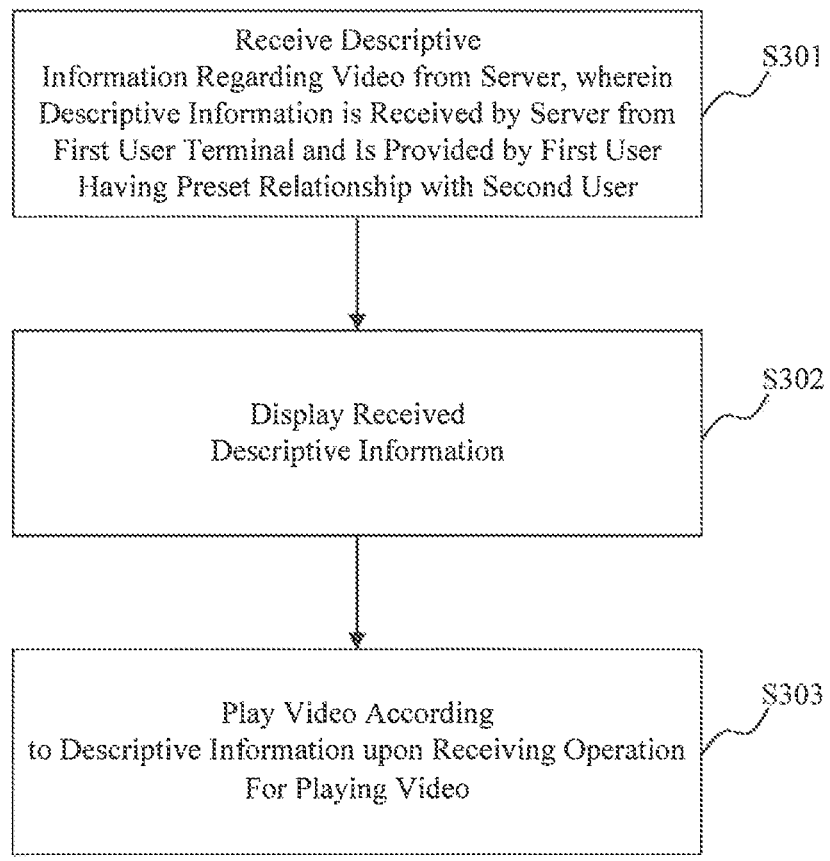
FIG. 3 is a flowchart of a method for sharing video information, according to an exemplary embodiment.

FIG. 3 is a flowchart of a method 300 for sharing video information, according to an exemplary embodiment. For example, the method 300 may be used in a second user terminal configured to communicate with a first user terminal through a server. Referring to FIG. 3, the method 300 includes the following steps, In step S301, the second user terminal receives descriptive information regarding a video from the server, wherein the descriptive information is received by the server from the first user terminal and is provided by a first user of the first terminal having a preset relationship with a second user of the second user terminal.

In exemplary embodiments, the descriptive information may include at least one of: a play progress of the video being currently played on the first user terminal, a comment made by the first user on the video, an identifier of the video, a play IP address of the video, and a play progress of the video when the first user terminal receives the comment from the first user.

In step S302, the second user terminal displays the received descriptive information.

In step S303, the second user terminal plays the video according to the descriptive information upon receiving an operation for playing the video. For example, upon receiving the descriptive information, the second user of the second user terminal may input a request for playing the video according to an information prompt option.

In one exemplary embodiment, the descriptive information includes an identifier of the video and/or a play IP address of the video. Accordingly, the second user terminal acquires the video according to the identifier and/or the play IP address, and plays the video from a start of the video.

In one exemplary embodiment, the descriptive information includes an identifier of the video and/or a play IP address of the video, and a play progress of the video being currently played on the first user terminal. Accordingly, the second user terminal acquires the video according to the identifier and/or the play IP address, and plays the video from the play progress of the video being currently played on the first user terminal.

In one exemplary embodiment, the descriptive information includes an identifier of the video and/or a play IP address of the video, and a play progress of the video when the first user terminal receives the first user's comment regarding the video as the descriptive information. Accordingly, the second user terminal acquires the video according to the identifier and/or the play IP address, and plays the video from the play progress of the video when the first user terminal receives the first user's comment.

Figure 4:
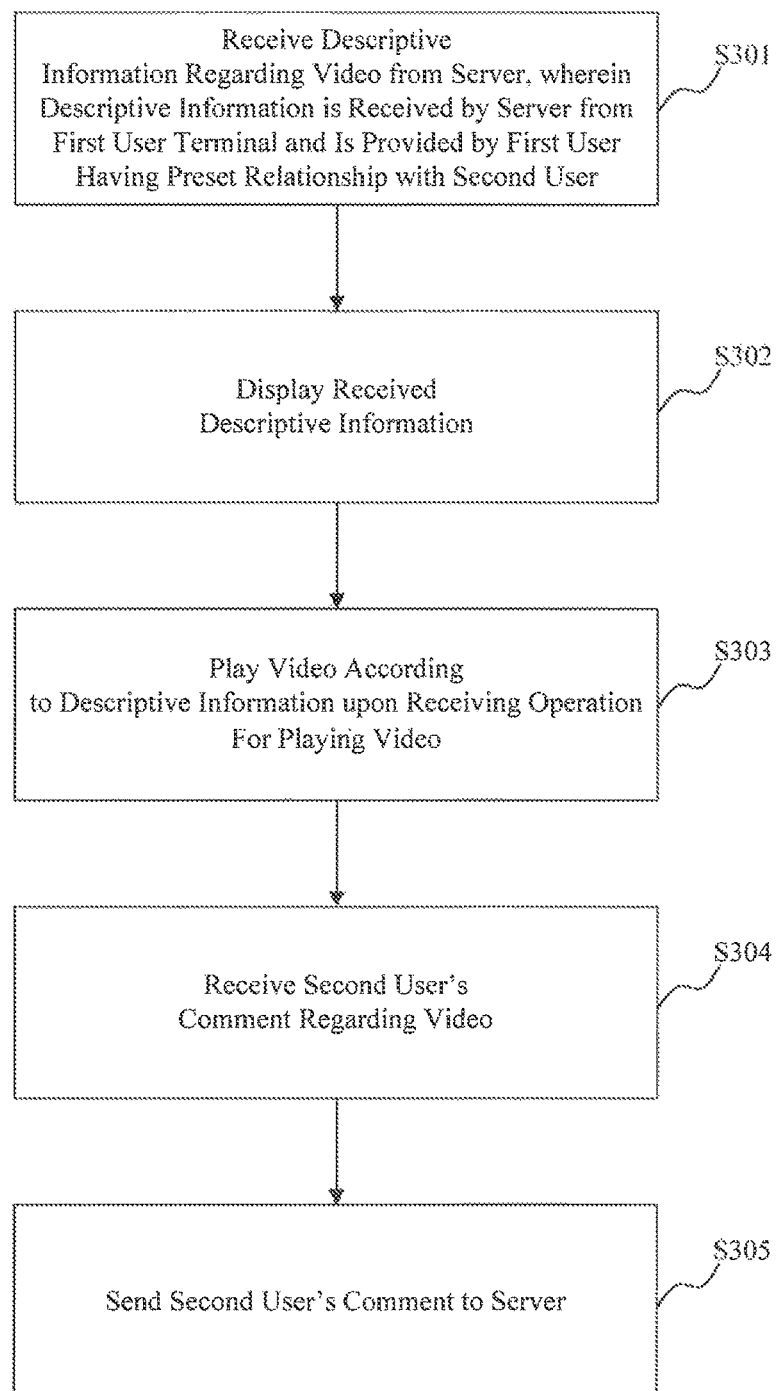
FIG. 4 is a flowchart of a method for sharing video information, according to an exemplary embodiment.

FIG. 4 is a flowchart of a method 400 for sharing video information, according to an exemplary embodiment. Referring to FIG. 4, in addition to steps S301-S303 (FIG. 3), the method 400 further includes the following steps.

In step S304, the second user terminal receives the second user's comment regarding the video.

In step S305, the second user terminal sends the second user's comment to the server, for the server to send to the first user terminal for display.

For example, the second user of the second user terminal may make a comment when watching the video, and the server may forward the second user's comment to the first user terminal. In this way, the video is shared between the first user terminal and the second user terminal, and interaction or exchange may be implemented therebetween.

Figure 5:
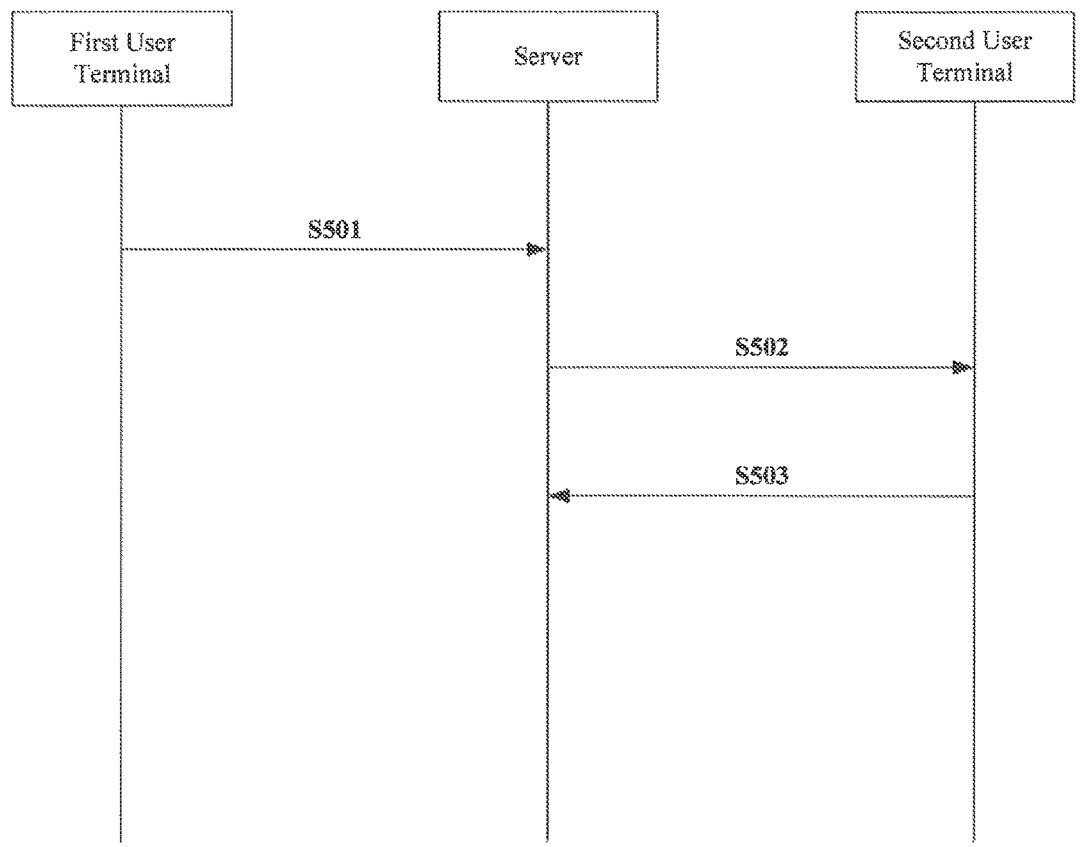
FIG. 5 is a schematic diagram illustrating signaling of a method for sharing video information, according to an exemplary embodiment.

FIG. 5 is a schematic diagram illustrating signaling of a method 500 for sharing video information, according to an exemplary embodiment. Referring to FIG. 5, the method 500 includes the following steps.

In step S501, a first user terminal sends descriptive information regarding a video to a server. The first user terminal may encapsulate such contents as a description given by a first user of the first user terminal when watching the video, a time of the description, and a play IP address of the video into the descriptive information, and send the descriptive information to the server. Table 1 illustrates an example of the descriptive information.

TABLE 1

| Video Name | Description | Time | IP Address of Video |
|---|---|---|---|
| The Lord of the Rings III | "The scenes are grand and gorgeous!" | 2.21 16:28:50 | xxxxxxxx |

In step S502, the server forwards the descriptive information to a second user terminal.

In step S503, upon receiving the descriptive information of the video, the second user terminal may request watching the video according to the descriptive information.

Figure 6:
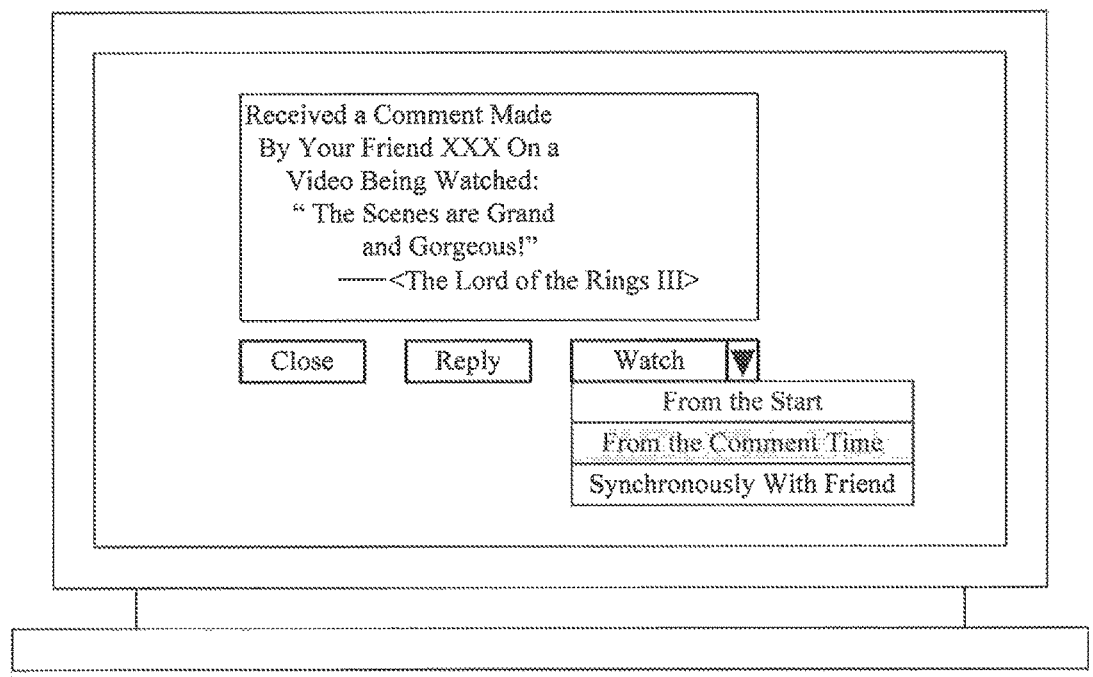
FIG. 6 is a schematic diagram of an interface after a user terminal receives descriptive information, according to an exemplary embodiment.

FIG. 6 is a schematic diagram of an interface 600 displayed on the second user terminal after the second user terminal receives the descriptive information, according to an exemplary embodiment. In the interface 600, the second user of the second user terminal may select a video watching manner, for example, "watching from the start", "watching from the comment time", "watching synchronously with friend" (i.e., watching from a play progress of the video being currently played on the first user terminal). Subsequently, the second user terminal sends a request for playing the video to the server according to the second user's selection. Upon receiving the request, the server plays the video on the second user terminal.

Figure 7:
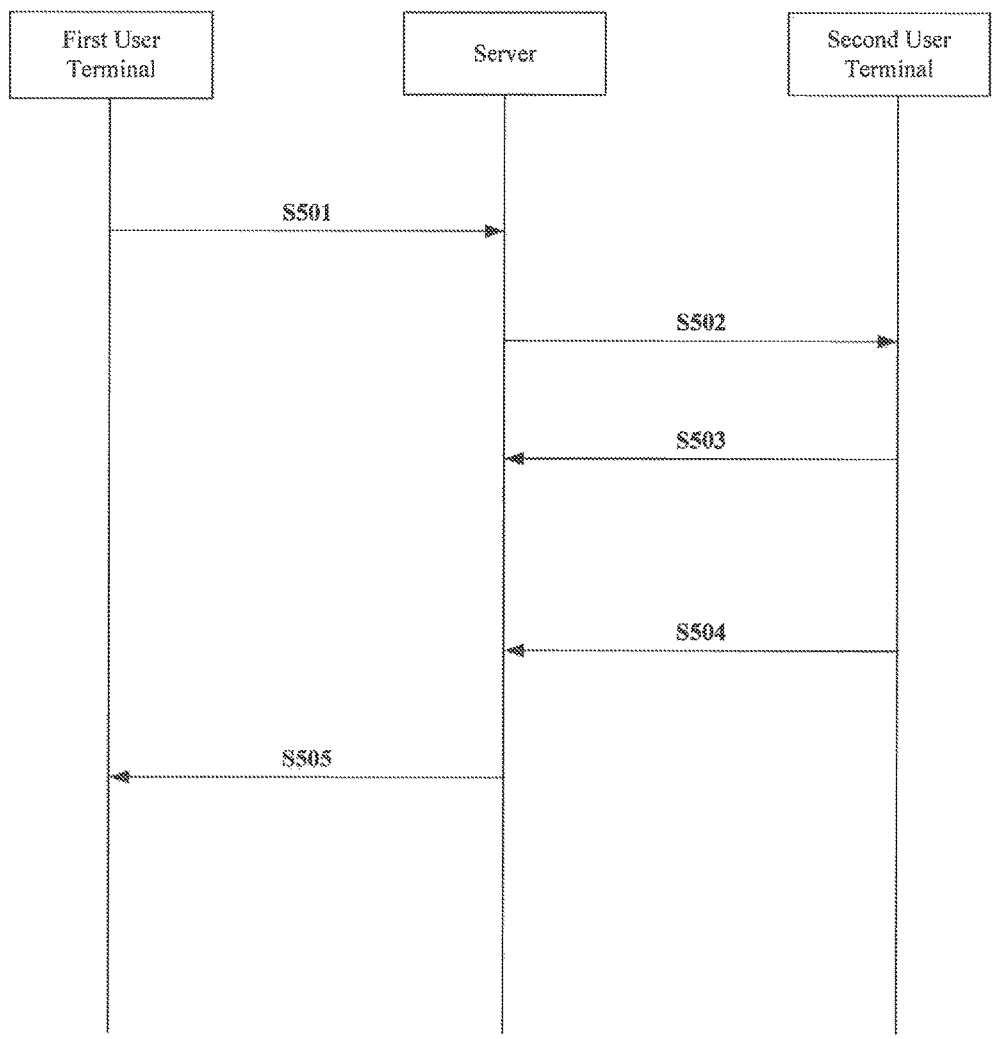
FIG. 7 is a schematic diagram illustrating signaling of a method for sharing video information, according to an exemplary embodiment.

FIG. 7 is a schematic diagram illustrating signaling of a method 700 for sharing video information, according to an exemplary embodiment. In addition to steps S501, S502, and S503 (FIG. 5), the method 700 further includes the following steps.

In step S504, the second user terminal sends a responsive comment to the server. For example, the second user makes the responsive comment in response to the first user's comment regarding the video.

In step S505, the server forwards the responsive comment to the first user terminal.

Figure 8:
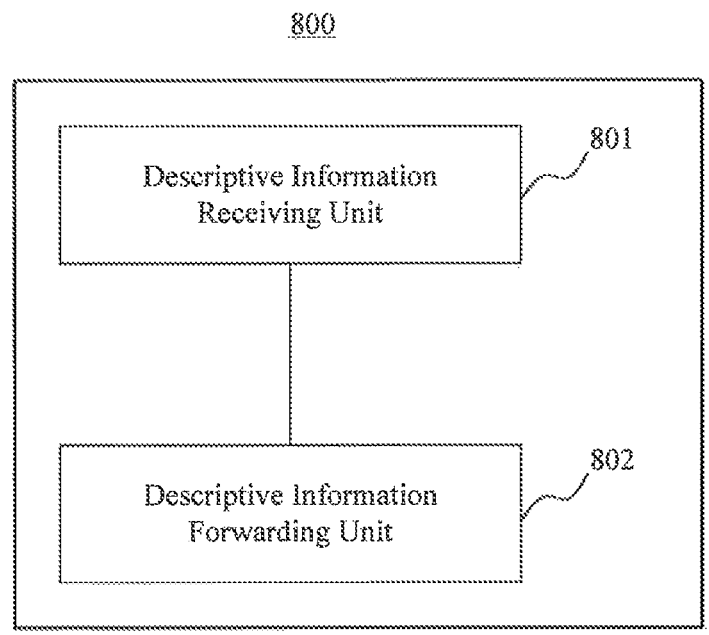
FIG. 8 is a block diagram of an apparatus for sharing video information, according to an exemplary embodiment.

FIG. 8 is a block diagram of an apparatus for sharing video information, according to an exemplary embodiment. The apparatus 800 may be a server or a part of the server. Referring to FIG. 8, the apparatus 800 may include a descriptive information receiving unit 801 and a descriptive information forwarding unit 802.

The descriptive information receiving unit 801 is configured to receive descriptive information regarding a video from a first user terminal. The descriptive information forwarding unit 802 is configured to send the descriptive information to a second user terminal, a second user of the second user terminal having a preset relationship with a first user of the first user terminal. Accordingly, the second user terminal plays the video according to the received descriptive information.

For example, the descriptive information may include at least one of: a play progress of the video being currently played on the first user terminal, the first user's comment received by the first user terminal regarding the video, an identifier of the video, a play IP address of the video, and a play progress of the video when the first user terminal receives the first user's comment.

Figure 9:
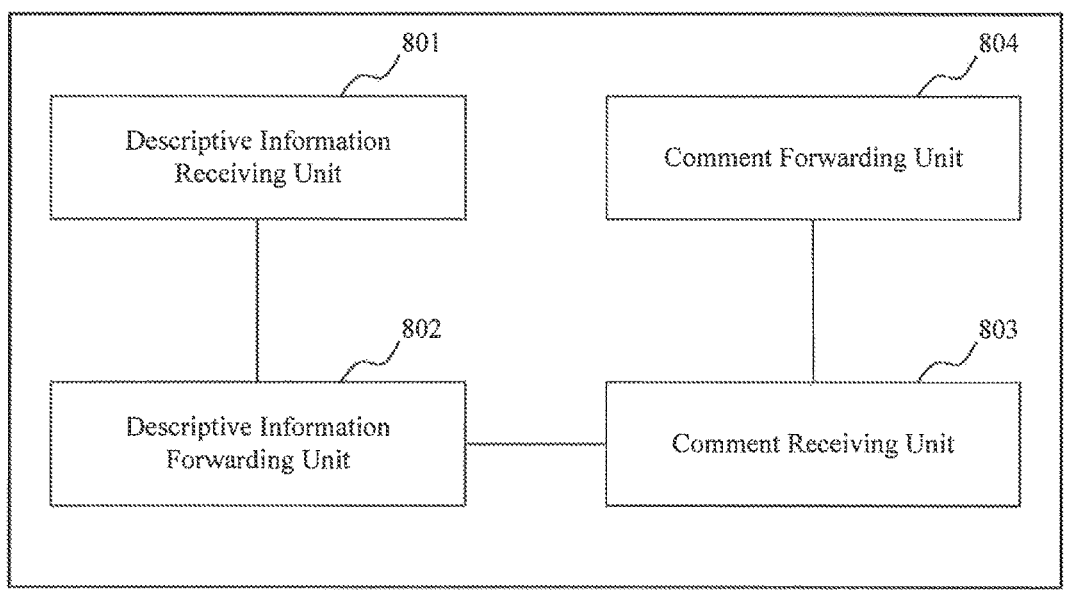
FIG. 9 is a block diagram of an apparatus for sharing video information, according to an exemplary embodiment.

FIG. 9 is a block diagram of an apparatus 900 for sharing video information, according to an exemplary embodiment. The apparatus 900 may be a server or a part of the server. Referring to FIG. 9, in addition to the descriptive information receiving unit 801 and the descriptive information forwarding unit 802 (FIG. 8), the apparatus 900 further includes a comment receiving unit 803 and a comment forwarding unit 804.

The comment receiving unit 803 is configured to receive a comment from the second user terminal regarding the video. For example, the comment is made by the second user of the second user terminal. The comment forwarding unit 804 is configured to send the comment received from the second user terminal to the first user terminal, such that the first user terminal receives the comment and displays the comment.

Figure 10:
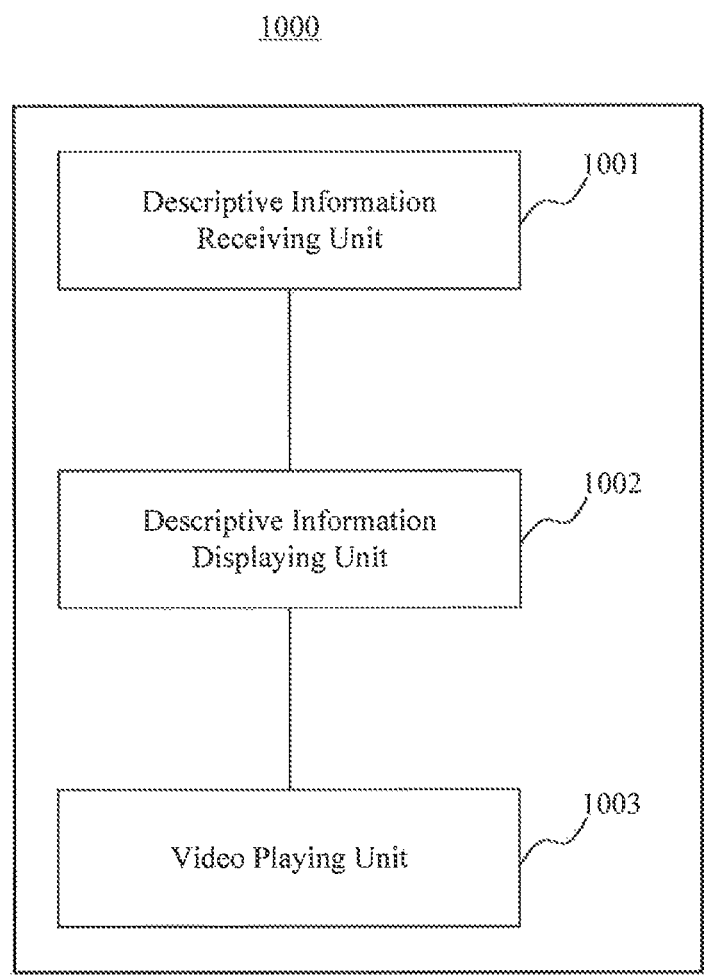
FIG. 10 is a block diagram of an apparatus for sharing video information, according to an exemplary embodiment.

FIG. 10 is a block diagram of an apparatus 1000 for sharing video information, according to an exemplary embodiment. For example, the apparatus 1000 may be a second user terminal configured to communicate with a first user terminal through a server, or a part of the second user terminal. Referring to FIG. 10, the apparatus 1000 includes a descriptive information receiving unit 1001, a descriptive information displaying unit 1002, and a video playing unit 1003.

The descriptive information receiving unit 1001 is configured to receive descriptive information regarding a video from the server. The descriptive information is received by the server from the first user terminal, a first user of the first user terminal having a preset relationship with a second user of the second user terminal. The descriptive information displaying unit 1002 is configured to display the descriptive information. The video playing unit 1003 is configured to play the video according to the descriptive information upon receiving an operation for playing of the video.

For example, the descriptive information may include at least one of: a play progress of the video being currently played on the first user terminal, a comment made by the first user of the first user terminal regarding the video, an identifier of the video, a play IP address of the video, and a play progress of the video when the first user terminal receives the comment from the first user.

Figure 11:
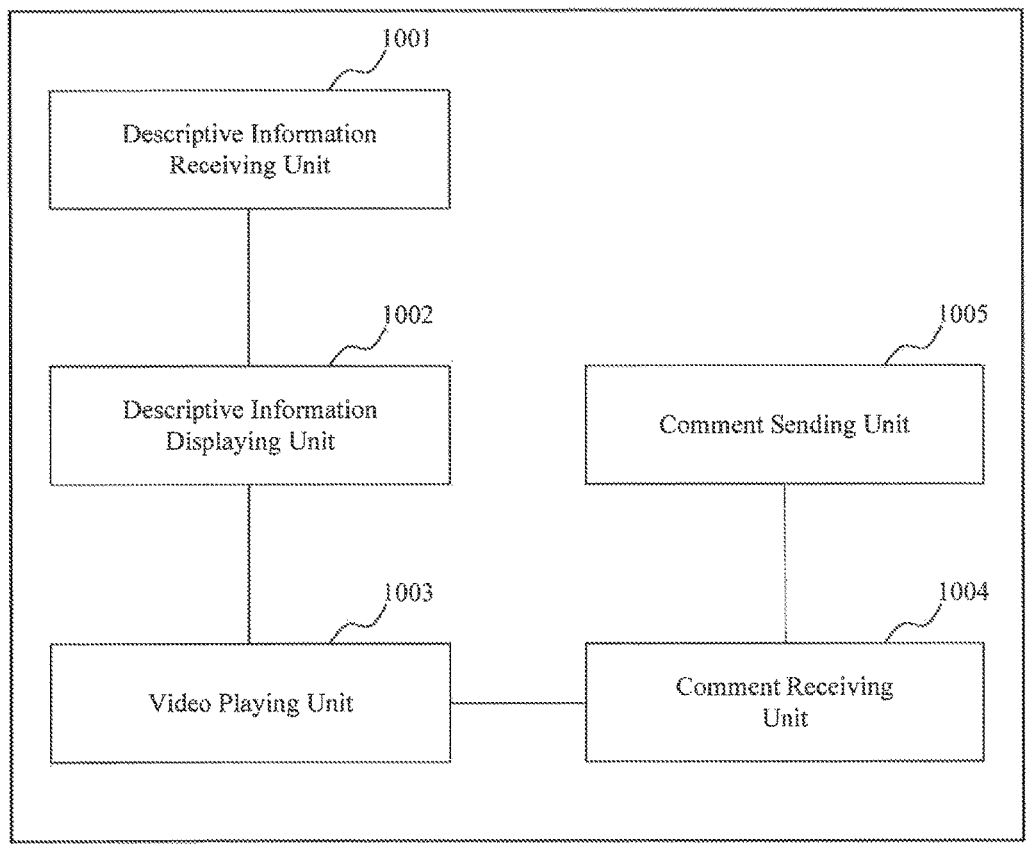
FIG. 11 is a block diagram of an apparatus for sharing video information, according to an exemplary embodiment.

FIG. 11 is a block diagram of an apparatus 1100 for sharing video information, according to an exemplary embodiment. The apparatus 1100 may be the second user terminal or a part of the second user terminal. Referring to FIG. 11, in addition to the descriptive information receiving unit 1001, the descriptive information displaying unit 1002, and the video playing unit 1003 (FIG. 10), the apparatus 1100 further includes a comment receiving unit 1004 and a comment sending unit 1005.

The comment receiving unit 1004 is configured to receive a comment regarding the video. The comment sending unit 1005 is configured to send the comment to the server, such that the server sends the comment to the first user terminal for display.

Figure 12:
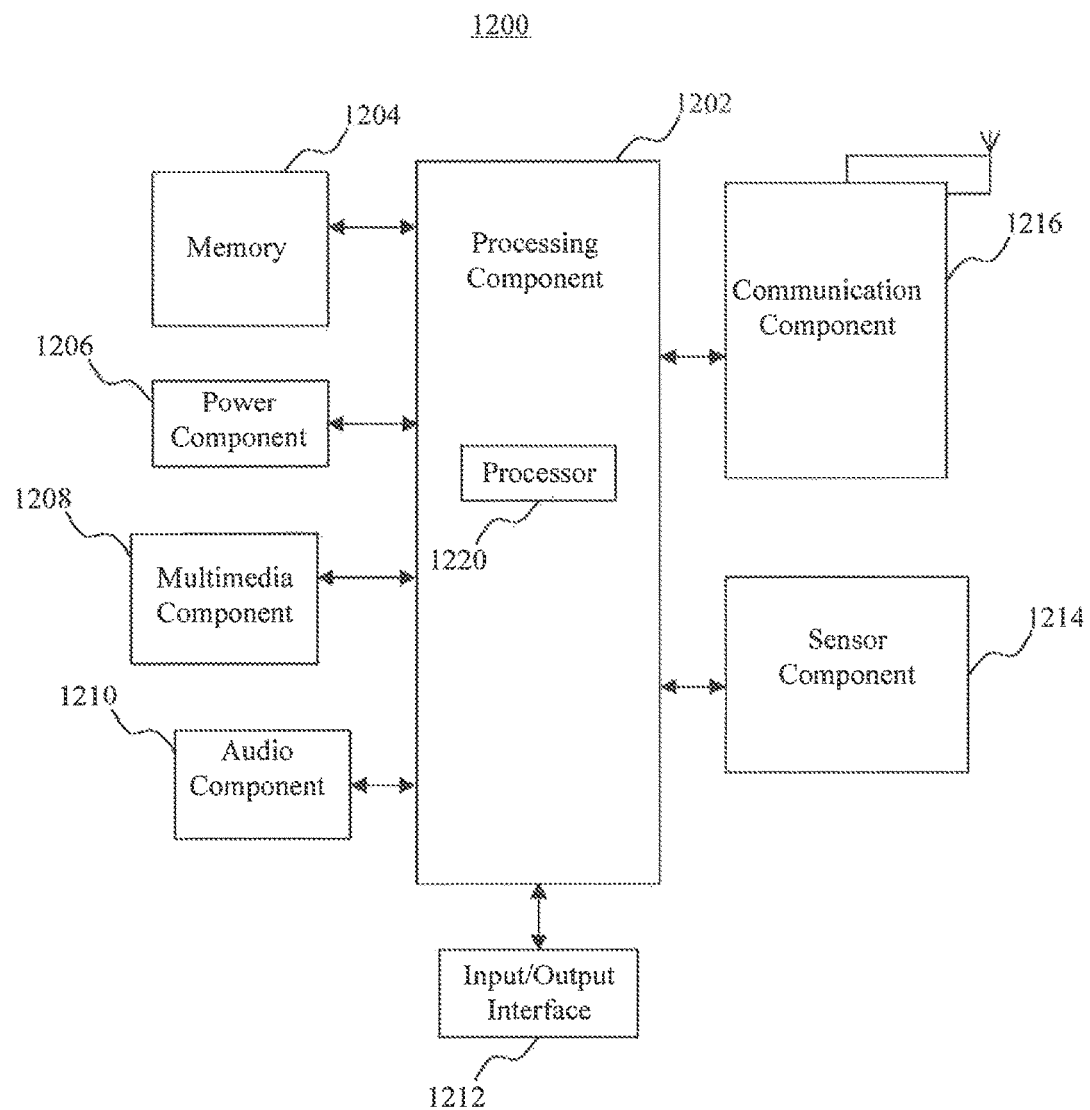
FIG. 12 is a block diagram of a user terminal for sharing video information, according to an exemplary embodiment.

FIG. 12 is a block diagram of a user terminal 1200 for sharing video information, according to an exemplary embodiment. For example, the user terminal 1200 may be a mobile phone, a computer, a digital broadcast terminal, a messaging device, a gaming console, a tablet, a medical device, exercise equipment, a personal digital assistant, and the like.

Referring to FIG. 12, the user terminal 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the user terminal 1200, such as the operations associated with display, telephone calls, data communications, camera operations, and recording operations. The processing component 1202 may include one or more processors 1220 to execute instructions to perform all or a part of the steps in the above-described methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operations of the user terminal 1200. Examples of such data include instructions for any application or method operated on the user terminal 1200, contact data, phonebook data, messages, pictures, videos, and the like. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the user terminal 1200. The power component 1206 may include a power management system, one or more power supplies, and other components associated with the generation, management, and distribution of power in the user terminal 1200.

The multimedia component 1208 includes a screen providing an output interface between the user terminal 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and/or the rear camera may receive external multimedia data while the user terminal 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone configured to receive an external audio signal when the user terminal 1200 is in an operation mode, such as a call mode, a recording mode, or a voice recognition mode. The received audio signal may be further stored in the memory 1204 or transmitted via the communication component 1216. In some embodiments, the audio component 1210 further includes a speaker to output audio signals.

The I/O interface 1218 provides an interface between the processing component 1202 and a peripheral interface module, such as a keyboard, a click wheel, a button, or the like. The buttons may include, but are not limited to, a home button, a volume button, a starting button, and a locking button.

The sensor component 1214 includes one or more sensors to provide status assessments of various aspects of the user terminal 1200. For example, the sensor component 1214 may detect an open/closed status of the user terminal 1200, relative positioning of components, e.g., the display and the keypad, of the user terminal 1200, a change in position of the user terminal 1200 or a component of the user terminal 1200, a presence or absence of user contact with the user terminal 1200, an orientation or an acceleration/deceleration of the user terminal 1200, and a change in temperature of the user terminal 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communications, wired or wirelessly, between the user terminal 1200 and other devices. The user terminal 1200 may access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the user terminal 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 1204, executable by the processor 1220 in the user terminal 1200, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

Figure 13:
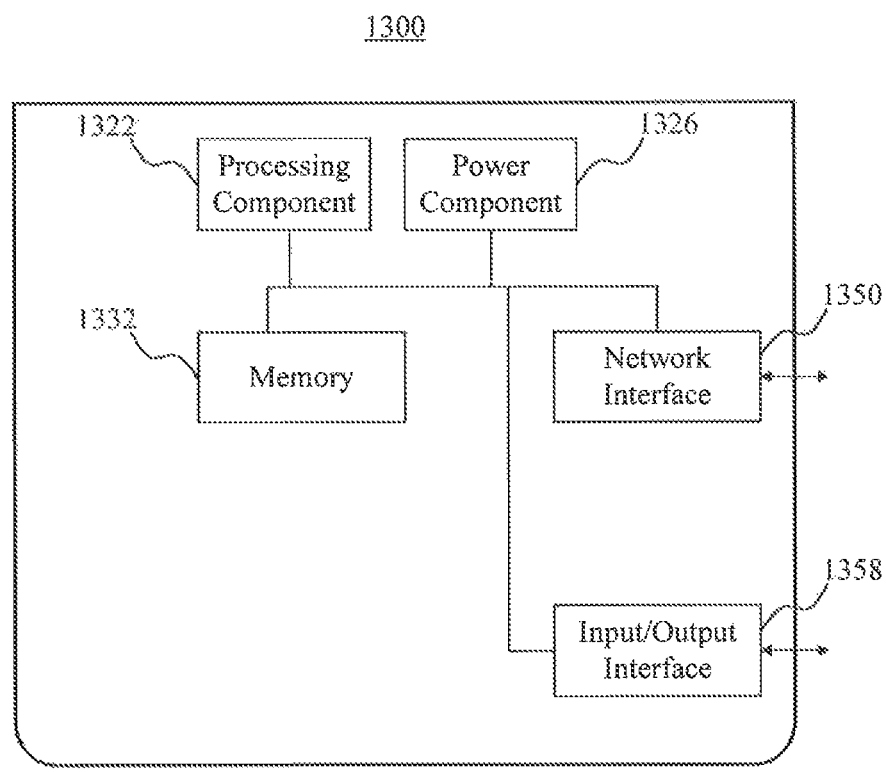
FIG. 13 is a block diagram of a server for sharing video information, according to an exemplary embodiment.

FIG. 13 is a block diagram of a server 1300 for sharing video information, according to an exemplary embodiment.

Referring to FIG. 13, the server 1300 includes a processing component 1322 which further includes one or more processors, and memory resources represented by a memory 1332, configured to store instructions executable by the processing component 1322, for example, applications. The applications stored in the memory 1332 may include one or more modules each corresponding to a group of instructions. In addition, the processing component 1322 is configured to execute the instructions to perform the above methods.

The server 1300 may further include a power component 1326 configured to perform power management, a wired or wireless network interface 1350 configured to connect the server 1300 to a network, and an input/output (I/O) interface 1358. The server 1300 may operate based on an operating system stored in the memory 1332, for example, Windows Server™, Mac OS X™, Unix™, Linux™, FreeBSD™, or the like.

In exemplary embodiments, there is also provided a non-transitory computer-readable storage medium including instructions, such as included in the memory 1304, executable by the processing component 1322 in the server 1300, for performing the above-described methods. For example, the non-transitory computer-readable storage medium may be a ROM, a random access memory (RAM), a compact disc read-only memory (CD-ROM), a magnetic tape, as floppy disc, an optical data storage device, or the like.

One of ordinary skill in the art will understand that the above described units can each be implemented by hardware, or software, or a combination of hardware and software. One of ordinary skill in the art will also understand that multiple ones of the above described units may be combined as one unit, and each of the above described units may be further divided into a plurality of sub-units.

Other embodiments of the present disclosure will be apparent to those skilled in the art from consideration of the specification and practice of disclosure herein. This application is intended to cover any variations, uses, or adaptations of the present disclosure following the general principles thereof and including such departures from the present disclosure as coming within common knowledge or customary technical means in the art. It is intended that the specification and examples be considered as exemplary only, with a true scope and spirit of the present disclosure being indicated by the appended claims.

It will be appreciated that the present disclosure is not limited to the exact structure that has been described above and illustrated in the accompanying drawings, and that various modifications and changes can be made without departing from the scope thereof. The scope of the present disclosure is only defined by the appended claims.

What is claimed is:

1. A method for a server to share video information, comprising:
   receiving descriptive information regarding a video from a first user terminal, the descriptive information including a play progress of the video when the first user terminal receives a comment regarding the video from the first user; and
   in response to the receiving of the descriptive information, sending the descriptive information to a second user terminal, for the second user terminal to play the video according to the descriptive information, wherein a first user of the first user terminal has a preset relationship with a second user of the second user terminal.

2. The method according to claim 1, wherein the receiving of the descriptive information further comprises:
   receiving at least one of: a play progress of the video being currently played on the first user terminal, the comment made by the first user regarding the video, an identifier of the video, or a play Internet Protocol (IP) address of the video.

3. The method according to claim 1, wherein after the sending of the descriptive information to the second user terminal, the method further comprises:
   receiving, from the second user terminal, a comment made by the second user regarding the video; and
   sending the comment made by the second user to the first user terminal for display.

4. A method for sharing video information on a second user terminal, the second user terminal being configured to communicate with a first user terminal through a server, the method comprising:
   receiving descriptive information regarding a video from the server, wherein the descriptive information is provided by a first user of the first user terminal having a preset relationship with a second user of the second user terminal, includes a play progress of the video when the first user terminal receives a comment regarding the video from the first user, and is sent by the server to the second user terminal in response to receiving the descriptive information from the first user terminal;
   displaying the descriptive information; and
   playing the video according to the descriptive information upon receiving an operation for playing of the video.

5. The method according to claim 4, wherein the receiving of the descriptive information further comprises:
   receiving at least one of: a play progress of the video being currently played on the first user terminal, the comment made by the first user regarding the video, an identifier of the video, or a play Internet Protocol (IP) address of the video.

6. The method according to claim 5, wherein when the descriptive information includes at least one of the identifier of the video or the play IP address of the video, the playing of the video according to the descriptive information comprises:
   acquiring the video according to the at least one of the identifier of the video or the play IP address of the video; and
   playing the video from a start of the video.

7. The method according to claim 5, wherein when the descriptive information includes a play progress of the video being currently played on the first user terminal and at least one of the identifier of the video or the play IP address of the video, the playing of the video according to the descriptive information comprises:

acquiring the video according to the at least one of the identifier of the video or the play IP address of the video; and playing the video from the play progress of he video being currently played on the first user terminal.

8. The method according to claim 5, wherein when the descriptive information includes a play progress of the video when the first user terminal receives the comment from the first user and at least one of the identifier of the video or the play IP address of the video, the playing of the video according to the descriptive information comprises:

acquiring the video according to the at least one of the identifier of the video or the play IP address of the video; and playing the video from the play progress of the video when the first user terminal receives the comment from the first user.

9. The method according to claim 4, wherein after the playing of the video according to the descriptive information, the method further comprises:

receiving a comment regarding the video from the second user; and sending the comment to the server, for the server to send the comment to the first user terminal for display.

10. A server for sharing video information, comprising:
a processor;
a memory for storing instructions executable by the processor;
wherein the processor is configured to:
receive descriptive information regarding a video from a first user terminal, the descriptive information including a play progress of the video when the first user terminal receives a comment regarding the video from the first user; and
in response to the receiving of the descriptive information, send the descriptive information to a second user terminal, for the second user terminal to play the video according to the descriptive information, wherein a first user of the first user terminal has a preset relationship with a second user of the second user terminal.

11. The server according to claim 10, wherein the processor is further configured to:
receive, as the descriptive information, at least one of: a play progress of the video being currently played on the first user terminal, the comment made by the first user regarding the video, or an identifier of the video, a play Internet Protocol (IP) address of the video.

12. The server according to claim 10, wherein after the sending of the descriptive information to the second user terminal, the processor is further configured to:
receive, from the second user terminal, a comment made by the second user regarding the video; and
send the comment made by the second user to the first user terminal for display.

13. A second user terminal for sharing video information, the second user terminal being configured to communicate with a first user terminal through a server, the second user terminal comprising:
a processor; and
a memory for storing instructions executable by the processor;

wherein the processor is configured to:
receive descriptive information regarding a video from the server, wherein the descriptive information is provided by a first user of the first user terminal having a preset relationship with a second user of the second user terminal, includes a play progress of the video when the first user terminal receives a comment regarding the video from the first user, and is sent by the server to the second user terminal in response to receiving the descriptive information from the first user terminal;
display the descriptive information; and
play the video according to the descriptive information upon receiving an operation for playing of the video.

14. The second user terminal according to claim 13, wherein the processor is further configured to:
receive, as the descriptive information, at least one of: a play progress of the video being currently played on the first user terminal, a comment made by the first user regarding the video, an identifier of the video, or a play Internet Protocol (IP) address of the video.

15. The second user terminal according to claim 14, wherein when the descriptive information includes at least one of the identifier of the video or the play IP address of the video, the processor is further configured to:
acquire the video according to the at least one of the identifier of the video or the play IP address of the video; and
play the video from a start of the video.

16. The second user terminal according to claim 14, wherein when the descriptive information includes a play progress of the video being currently played on the first user terminal and at least one of the identifier of the video or the play IP address of the video, the processor is further configured to:
acquire the video according to the at least one of the identifier of the video or the play IP address of the video; and
play the video from the play progress of the video being currently played on the first user terminal.

17. The second user terminal according to claim 14, wherein when the descriptive information includes a play progress of the video when the first user terminal receives the comment from the first user and at least one of the identifier of the video or the play IP address of the video, the processor is further configured to:
acquire the video according to the at least one of the identifier of the video or the play IP address of the video; and
play the video from the play progress of the video when the first user terminal receives the comment from the first user.

18. The second user terminal according to claim 13, wherein after the playing of the video according to the descriptive information, the processor is further configured to:
receive a comment regarding the video from the second user; and
send the comment to the server, for the server to send the comment to the first user terminal for display.

* * * * *